(12) United States Patent
Sample et al.

(10) Patent No.: US 12,191,546 B2
(45) Date of Patent: Jan. 7, 2025

(54) PRESSURE-COMPENSATED FLOW BATTERY FOR SUBMERGED USE

(71) Applicant: United States of America as Represented by the Secretary of the Navy, San Diego, CA (US)

(72) Inventors: Dwane F. Sample, San Diego, CA (US); Carl E. Lostrom, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 110 days.

(21) Appl. No.: 17/483,503

(22) Filed: Sep. 23, 2021

(65) Prior Publication Data

US 2023/0088777 A1    Mar. 23, 2023

(51) Int. Cl.
*H01M 8/18*          (2006.01)
*H01M 8/04276*   (2016.01)
*H01M 8/0273*     (2016.01)

(52) U.S. Cl.
CPC ....... *H01M 8/188* (2013.01); *H01M 8/04276* (2013.01); *H01M 8/0273* (2013.01)

(58) Field of Classification Search
CPC .... H05K 7/00–14337; Y10T 137/2036; B63G 8/00–001; H01M 8/188; H01M 8/0271–0276; H01M 8/0476; H01M 8/04276; H01M 8/04186; H01M 8/20; H01M 8/0273; H01M 8/18; H01M 8/04201; Y02E 60/50; Y02E 60/10; B65D 88/78; B65D 88/1618; B65D 88/1606;
(Continued)

(56) References Cited

U.S. PATENT DOCUMENTS 9,540,169 B1 * 1/2017 Krohn ................... B65D 88/78
2011/0117411 A1 5/2011 Horne
(Continued)

FOREIGN PATENT DOCUMENTS

DE       10324201 A1 * 12/2004  ........ H01M 8/04089
EP        2782434 A1 *  9/2014  ............. H05K 5/067

OTHER PUBLICATIONS

DE 10324201 A1 (2004)—English Translation—Accessed on Espacenet May 10, 2023 (Year: 2023).*
EP-2782434-A1—Piasecki et al. (Year: 2024).*

*Primary Examiner* — Allison Bourke
*Assistant Examiner* — Bethany C Garcia
(74) *Attorney, Agent, or Firm* — Naval Information Warfare Center, Pacific; Kyle Eppele; Paul C. Oestreich

(57) ABSTRACT

A flow battery comprising: a first tank having a variable internal volume and containing a first ionic solution having a first oxidation state, and wherein the first tank is substantially evacuated of any gas; a second tank having a variable internal volume and containing a second ionic solution having a second oxidation state that is different from the first oxidation state, and wherein the second tank is substantially evacuated of any gas; a reaction chamber operatively coupled with the first and second tanks such that the first ionic solution within the reaction chamber is separated from the second ionic solution by an ion exchange membrane; a first pump configured to pump the first ionic solution through the reaction chamber; and a second pump configured to pump the second ionic solution through the reaction chamber.

8 Claims, 4 Drawing Sheets

(58) Field of Classification Search
CPC .............. B65D 88/1643; B65D 88/1656;
B65D 88/54; B65D 90/046; B65D 90/32;
B65D 2590/046; Y02T 10/70; F17C
2270/0128; F17C 1/007; F17C 3/005;
B63B 2025/022; Y02P 70/50; F16L
55/04; G05D 16/06; C02F 2201/4616
See application file for complete search history.

(56) References Cited

U.S. PATENT DOCUMENTS

| | | | | |
|---|---|---|---|---|
| 2011/0223450 | A1* | 9/2011 | Horne | B60L 53/30 |
| | | | | 429/72 |
| 2012/0077095 | A1* | 3/2012 | Roumi | H01M 8/0247 |
| | | | | 429/405 |
| 2013/0167962 | A1* | 7/2013 | Skjetne | E21B 43/01 |
| | | | | 138/30 |
| 2016/0239027 | A1* | 8/2016 | Klingsheim | H05K 5/068 |
| 2016/0281452 | A1* | 9/2016 | Aarskog | E21B 41/0007 |
| 2016/0293963 | A1* | 10/2016 | Wessling | H01M 4/8615 |
| 2018/0342751 | A1* | 11/2018 | Klassen | H01M 8/0258 |
| 2020/0328446 | A1* | 10/2020 | Aarskog | H01M 8/188 |

\* cited by examiner

PRESSURE-COMPENSATED FLOW BATTERY FOR SUBMERGED USE

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 112981.

BACKGROUND OF THE INVENTION

The invention described herein relates to underwater power storage solutions. Underwater energy storage applications face many challenges including corrosion, bio-fouling, and increased pressure (especially at great depths or at the seafloor). There is a need for an improved energy storage solution that may be used underwater.

SUMMARY

Disclosed herein is a flow battery comprising first and second tanks, first and second pumps, and a reaction chamber. The first tank has a variable internal volume and contains a first ionic solution having a first oxidation state. The first tank is substantially evacuated of any gas. The second tank has a variable internal volume and contains a second ionic solution, which has a second oxidation state that is different from the first oxidation state. The second tank is also substantially evacuated of any gas. The reaction chamber is operatively coupled with the first and second tanks such that the first ionic solution within the reaction chamber is separated from the second ionic solution by an ion exchange membrane. The first and second pumps are configured to respectively pump the first and second ionic solutions through the reaction chamber.

Also described herein is a subsea flow battery that comprises first and second collapsible tanks, a reaction chamber, and first and second pumps. The first and second collapsible tanks are configured to contain an ionic salt solution. The oxidation state of the ionic salt solution differs between the first and second collapsible tanks. The reaction chamber is in fluid communication with the first and second collapsible tanks, and the ionic salt solution from the first collapsible tank is separated from the ionic salt solution from the second collapsible tank within the reaction chamber by an ion exchange membrane. The first and second pumps are configured to respectively pump the ionic salt solution through the reaction chamber from, and then back into, the first and second collapsible tanks.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The flow battery disclosed below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other flow battery described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
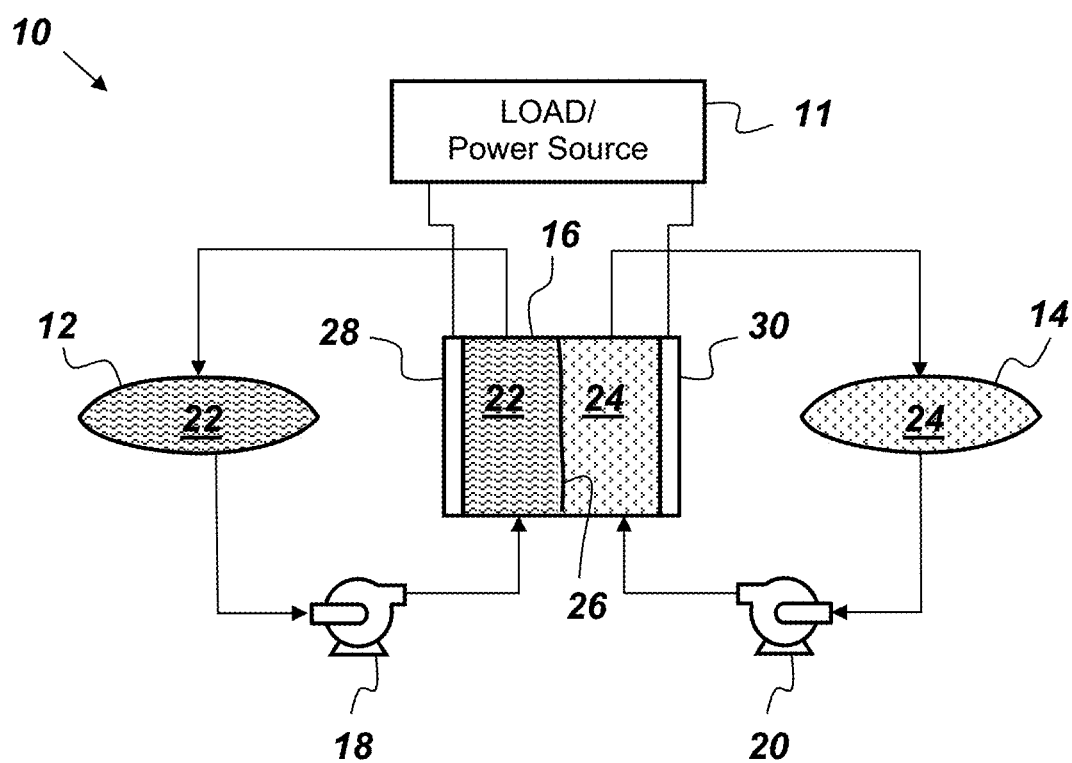
FIG. 1 is an illustration of an embodiment of a flow battery.

FIG. 1 is an illustration of an embodiment of a flow battery 10 that may be used high-pressure environments, such as may be encountered underwater or even at the seafloor. The flow battery 10 may be used in underwater environments to power any desired electrical load/power source 11. The flow battery 10 comprises, consists of, or consists essentially of a first tank 12, a second tank 14, a reaction chamber 16, a first pump 18, and a second pump 20. The first tank 12 has a variable internal volume, which is completely filled with a first ionic solution 22 having a first oxidation state. Likewise, the second tank 14 has a variable internal volume and is completely filled with a second ionic solution 24 (i.e. substantially evacuated of any gas) which has a second oxidation state that is different from the first oxidation state. It is to be understood that there may be negligible amounts of gas (e.g., air) that remain within the first and second tanks 12 and 14. The reaction chamber 16 is operatively coupled with the first and second tanks 12 and 14 such that the first ionic solution 22 within the reaction chamber 16 is separated from the second ionic solution 24 by an ion exchange membrane 26. The first pump 18 is configured to pump the first ionic solution 22 from the first tank 12 through the reaction chamber 16 and then back into the first tank 12. The second pump 20 is configured to pump the second ionic solution 24 from the second tank 14 through the reaction chamber 16 and then back to the second tank 14. As with the first and second tanks 12 and 14, the reaction chamber 16 is substantially evacuated of any gas such that only negligible amounts of any gas remain.

The first and second ionic solutions 22 and 24 may be any electrolyte containing one or more dissolved electroactive elements. In one embodiment of the flow battery 10, the first and second ionic solutions 22 and 24 are both Vanadium-based solutions, but each exists in a different oxidation state. For example, in one embodiment, the first and second ionic solutions 22 and 24 are vanadium pentoxide (V2O5) in sulfuric acid (H2SO4). When charge is applied to the flow battery 10 by introducing a voltage between first and second electrodes 28 and 30, $VO^{2+}$ ions in the first ionic solution 22 change to $VO_2^+$ ions and $V^{3+}$ ions in the second ionic solution 24 change to $V^{2+}$ ions. Charge may be applied to the flow battery 10 by many different embodiments of the load/power source 11, including, but not limited to, one or more of, or any combination of, an external power source, a battery, and an energy harvester. Upon discharge of the flow battery 10, the $VO_2^+$ ions in the first ionic solution 22 change to $VO^{2+}$ ions and $V^{2+}$ ions in the second ionic solution 24 change into $V^{3+}$ ions. The flow battery 10 may be used to power any device that requires electrical energy. The total amount of stored energy is dependent on the total volume of solution contained in the first and second tanks 12 and 14. The rate of charge or discharge is driven by the rate the solutions are pumped past each other and the surface area of the ion exchange membrane 26.

The first and second tanks 12 and 14 may be any type of variable-volume container suitable for containing the ionic solution. In the embodiment of the flow battery 10 shown in FIG. 1, the first and second tanks 12 and 14 are flexible, collapsible storage bladders, which are sometimes referred to as pillow tanks. Preferably, the first and second tanks 12 and 14 should be made of corrosion-resistant material suitable for submerged use in salt water. Because the first and second tanks 12 and 14 are compressible and collapsible, and completely filled with ionic solution 22 and 24 respectively, they are inherently pressure-compensated even at seafloor pressures. Accordingly, the flow battery 10 may be suitable for use when disposed on the seafloor.

Other suitable embodiments of the first and second tanks 12 and 14 include, but are not limited to, accordion-style collapsible tanks and rigid tanks with built-in pressure equalization mechanism such as an internal bladder or piston with sufficient volume to compensate for the pressure difference inside the first and second tanks 12 and 14 and ambient, external water pressure. In one embodiment, the first and second tanks 12 and 14 have a modulus of elasticity less than 1 and are made of an elastomeric compound that is resistant to the chemistry of the electrolytes (i.e., the first and second ionic solutions 22 and 24). In one specific embodiment, the first and second tanks 12 and 14 are collapsible storage bladders made of nitrile rubber with organically modified montmorillonite (OMMT) or polytetrafluoroethylene (PTFE). In another embodiment, the first and second tanks 12 and 14 are made of long lengths of flexible tubing (e.g., polyvinyl chloride) long enough to accommodate the desired volume of the first and second ionic solutions 22 and 24.

Figure 2A:
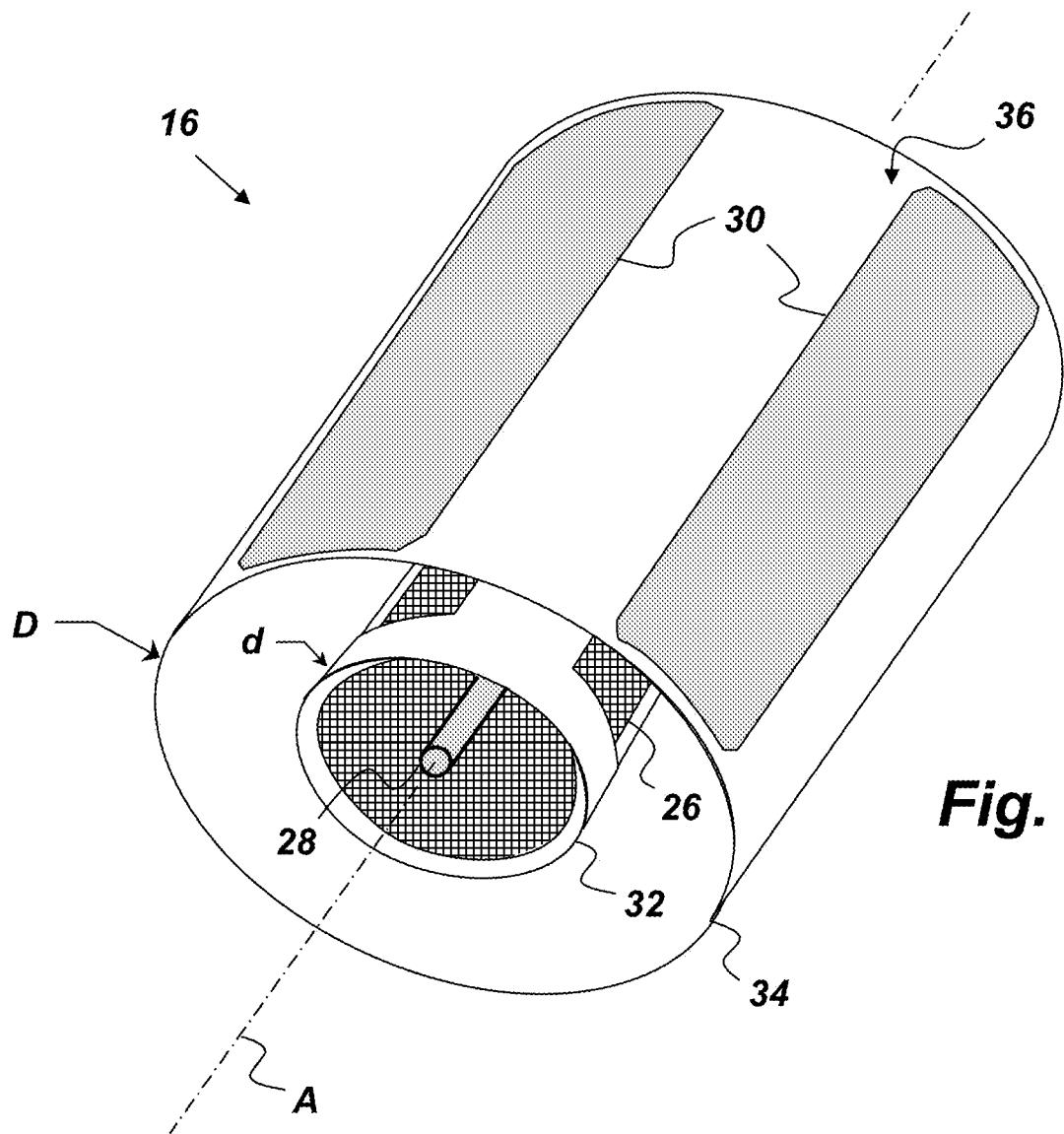
FIG. 2A is a perspective view of an embodiment of a flow battery reaction chamber.
Figure 2B:
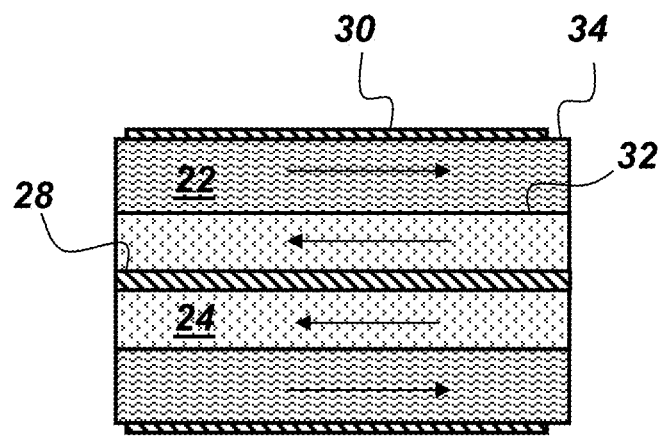
FIG. 2B is a cross-sectional, side view of an embodiment of a flow battery reaction chamber.

FIGS. 2A and 2B are respectively perspective- and cross-sectional, side-views of an embodiment of the reaction chamber 16. In this embodiment, the reaction chamber 16 comprises an inner tube 32 mounted within an outer tube 34. The inner tube 32 and the outer tube 34 are coaxial and share the same axis A. The inner tube 32 in this embodiment functions as a rigid frame to support panels of the membrane 26 such that the panels form walls of the inner tube 32. When used on the seafloor, because the differential pressure across the ion exchange membrane 26 is effectively zero, even at full ocean depth, the membrane 26 itself can be constructed from flat panels held in place on a rigid frame. One electrode 28 is placed within the inner tube 32 and the other electrode 30 is disposed on an outer surface 36 of the outer tube 34. It is to be understood that the electrode 30 may also be disposed within the outer tube 34. Preferably, the respective diameters D and d of the outer tube 34 and the inner tube 32 may be sized to have cross-sectional areas such that the flow rate of the first ionic solution 22 matches the flow rate of the second ionic solution 24. In the embodiment of the reaction chamber 16 shown in FIG. 2A, the inner and outer tubes 32 and 34 have circular cross-sections, but it is to be understood that the inner and outer tubes 32 and 34 may have any desired cross-sectional shape. For example, in one embodiment, the membrane 26 panels are flat such that the inner tube 32 has a polygonal cross-section.

Figure 3A:
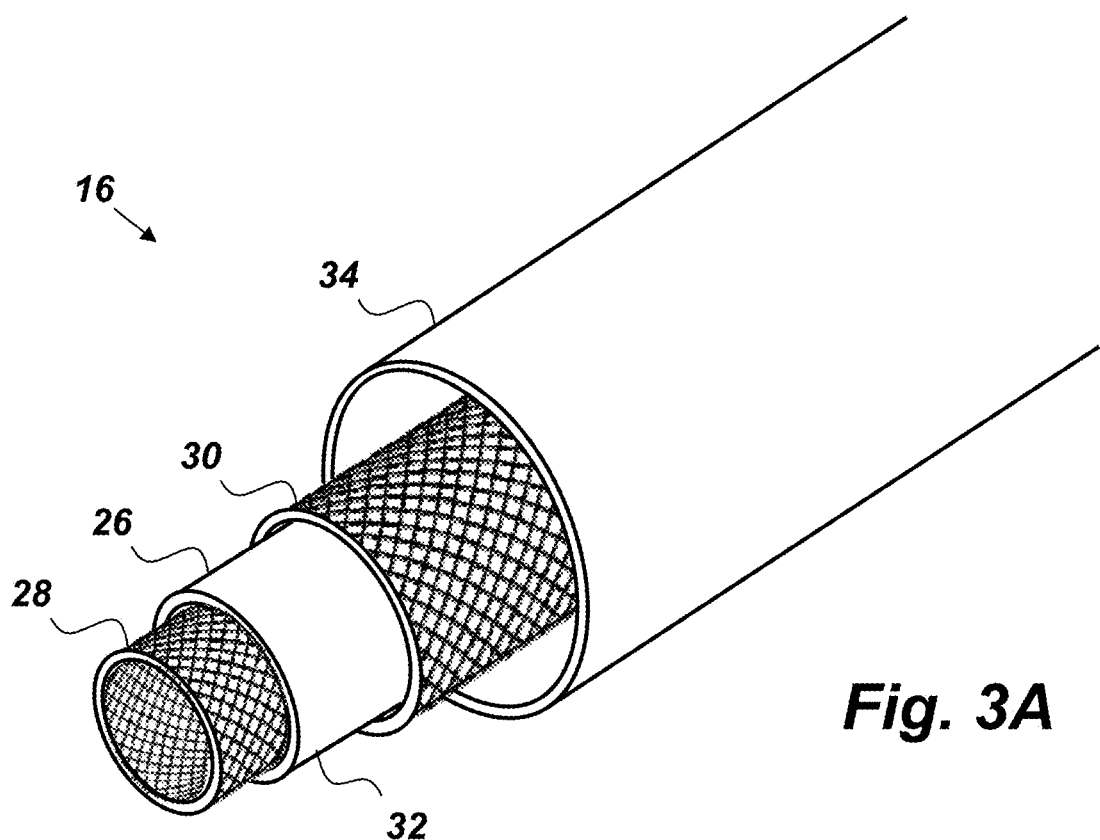
FIG. 3A is a perspective view of an embodiment of a flow battery reaction chamber.
Figure 3B:
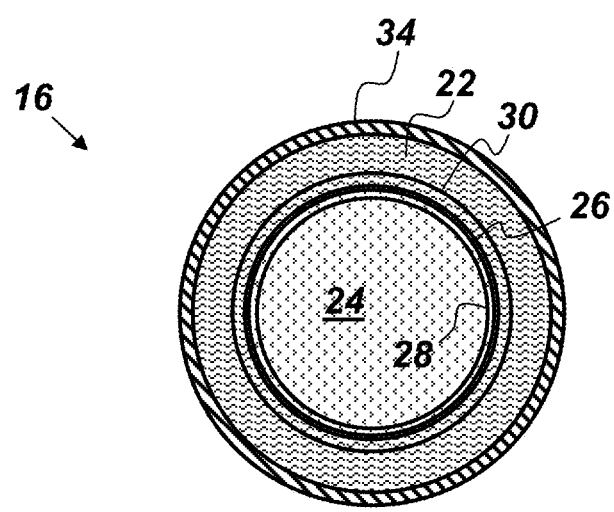
FIG. 3B is a cross-sectional, front view of an embodiment of a flow battery reaction chamber.

FIGS. 3A and 3B are respectively perspective- and cross-sectional, front-views of an embodiment of the reaction chamber 16. In this embodiment of the reaction chamber 16, the first and second electrodes 28 and 30 are carbon cloth sleeves and the membrane 26 is also cylindrical. In this embodiment, the inner tube 32 is entirely made of the ion exchange membrane 26. The first electrode 28 is disposed within the membrane 26, which also serves as a conduit for the second ionic solution 24. The second electrode 30 is disposed around the membrane 26 and within the outer tube 34, which serves as a conduit for the first ionic solution 22.

The membrane 26 may be made of any material that allows for the exchange of ions between the first and second ionic solutions 22 and 24, but prevents transfer of the liquid solution itself. Suitable examples of the membrane 26 include, but are not limited to, chlor-alkali membranes, perfluorosulfonic acid (PFSA) membranes, and polymer membranes. In one embodiment, the membrane 26 may be made of a sulfonated tetrafluoroethylene based fluoropolymer-copolymer, such as the product Nafion™ manufactured by the Chemours Company of Delaware. Panels of the membrane 26 may be mounted to a frame such as is shown in FIG. 2A, installed as a chamber partition such as is shown in FIG. 1, or may be a tube filled with either the first or second ionic solution 22 or 24.

The first and second pumps 18 and 20 may be any pump capable of pumping the first and second ionic solutions 22 and 24 through the reaction chamber. The first and second pumps 18 and 20 should be sized to support the required flow rates and pressures of the first and second ionic solutions 22 and 24. In one example embodiment, the first and second pumps 18 and 20 are centrifugal pumps with impellers made from an inert material such as polyetheretherketone (PEEK). In another embodiment, the first and second pumps 18 and 20 use a magnetic coupling for the impeller drive to reduce the likelihood of seal failure. Likewise, brushless, oil-compensated DC motors may be used to drive the first and second pumps 18 and 20.

The electrodes 28 and 30 may be any electrically conductive material such as, but not limited to, gold, silver, platinum, copper, PEEK, and carbon cloth. It is desirable that the electrodes 28 and 30 be chemically inert with respect to the first and second ionic solutions 22 and 24 and not have insulating oxides that form in the presence of the first and second ionic solutions 22 and 24.

Figure 4:
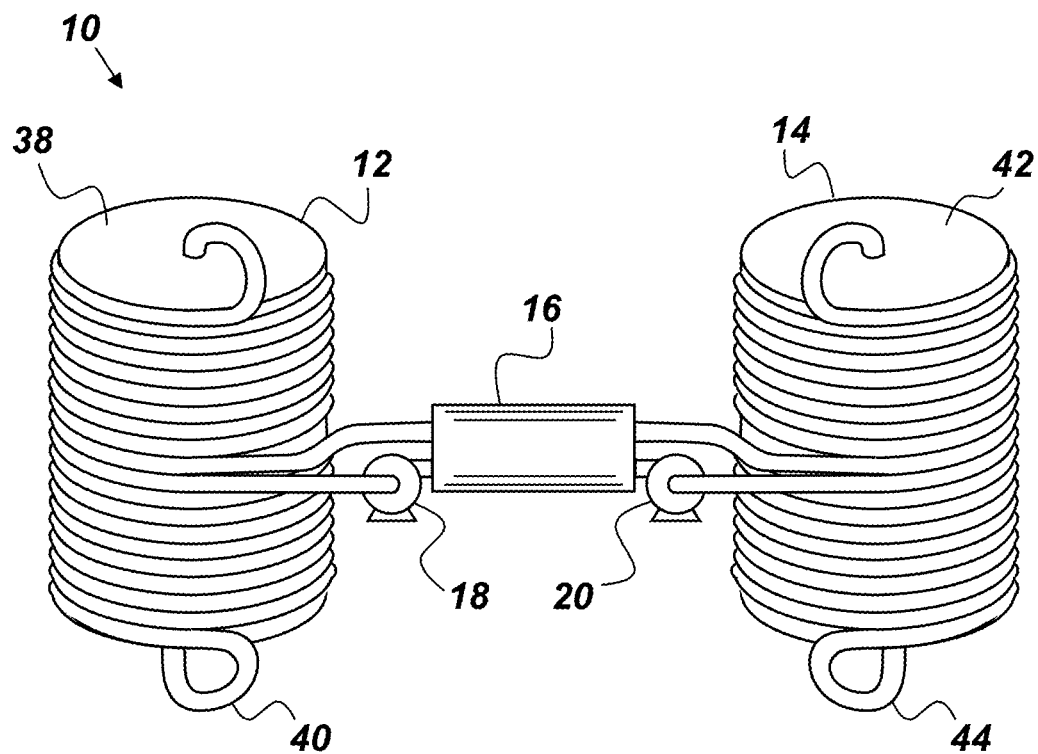
FIG. 4 is an illustration of an embodiment of a flow battery.

FIG. 4 is an illustration of an embodiment of the flow battery 10 where the first tank 12 comprises or consists of a first storage reservoir 38 and a first flexible hose 40. The second tank 14 comprises or consists of a second storage reservoir 42 and a second flexible hose 44. In this embodiment, it is desirable that the first and second flexible hoses 40 and 44 be compressible and long enough to function as pressure compensators for the first ionic solution 22 contained therein even in extreme ambient pressure conditions such as exist at the seafloor. The first and second storage reservoirs 38 and 42 may be rigid or semi rigid. In one embodiment, the first and second storage reservoirs 38 and 42 are made of a plastic that is chemically resistant to seawater and to the first and second ionic solutions 22 and 24. The first and second flexible hoses 40 and 44 are respectively wrapped around the first and second storage reservoirs 38 and 42 and serve to keep the pressure of the first and second ionic solutions 22 and 24 equal to the ambient pressure surrounding the flow battery 10. The first and second flexible hoses 40 and 44 also serve to move the first and second ionic solutions 22 and 24 into the reaction chamber 16 and then back into the first and second tanks 12 and 14 respectively. The first and second flexible hoses 40 and 44 may be made of flexible material that is chemically inert in the presence of the surrounding water and the first and second ionic solutions 22 and 24. A suitable example of material from which the first and second flexible hoses 40 and 44 may be made includes, but is not limited to, polymer tubing such as Tygon® tubing manufactured by Saint-Gobain, a French multinational corporation. The first and second storage reservoirs 38 and 42 may be rigid and structural, which could serve to reduce any piping drag on the first and second flexible hoses 40 and 44, and simplify construction.

From the above description of the flow battery 10, it is manifest that various techniques may be used for implementing the concepts of the flow battery 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the flow battery 10 is not limited to the particular embodiments described herein, but is capable of many embodiments without departing from the scope of the claims.

We claim:

1. A subsea flow battery comprising:
    first and second collapsible tanks configured to be positioned on a seafloor and directly exposed to ambient seawater and to contain an ionic salt solution, wherein an oxidation state of the ionic salt solution differs between the first and second collapsible tanks, wherein each collapsible tank further comprises a rigid or semi-rigid cylindrical storage reservoir;
    first and second compressible, flexible hoses, each of the first and second hoses wrapped in a coil around each of the respective storage reservoirs and having opposed hose ends in fluid communication through opposite ends of the respective storage reservoir, wherein each of the first and second compressible, flexible hoses is long enough and compressible enough such that a pressure of the ionic salt solution in each of the first and second collapsible tanks is equal to an ambient pressure surrounding the subsea flow battery due to compression of the first and the second compressible, flexible hoses;
    a reaction chamber in fluid communication with the first and second collapsible tanks via the respective first and second compressible, flexible hoses, wherein the ionic salt solution from the first collapsible tank is separated from the ionic salt solution from the second collapsible tank within the reaction chamber by an ion exchange membrane; and
    first and second pumps configured to respectively pump the ionic salt solution through the reaction chamber from, and then back into, the respective storage reservoirs of the first and second collapsible tanks via the first and second compressible, flexible hoses.

2. The subsea flow battery of claim 1, wherein the respective reservoirs each comprise a plastic that is chemically resistant to seawater and to the first and the second ionic salt solutions.

3. The subsea flow battery of claim 1, wherein the first and the second compressible, flexible hoses are made of polymer tubing.

4. The subsea flow battery of claim 1, wherein the reaction chamber comprises an inner tube and an outer coaxial tube, wherein the inner tube is disposed coaxially within the outer tube.

5. The subsea flow battery of claim 4, wherein sections of a tube wall of the inner tube are made of the ion exchange membrane.

6. The subsea flow battery of claim 4, wherein the inner tube is entirely made of the ion exchange membrane.

7. The flow battery of claim 4, wherein the inner tube comprises a rigid frame supporting a plurality of panels of the ion exchange membrane such that the panels form walls of the inner tube.

8. The flow battery of claim 7, wherein the panels are flat such that the inner tube has a polygonal cross-section.

* * * * *